Sept. 25, 1962   E. E. SCHOESSOW   3,055,538
PRESSURE VESSEL SEAL

Filed Jan. 30, 1958   2 Sheets-Sheet 1

INVENTOR.
Earl E. Schoessow
BY
*J. Moran*
ATTORNEY

Sept. 25, 1962   E. E. SCHOESSOW   3,055,538
PRESSURE VESSEL SEAL
Filed Jan. 30, 1958   2 Sheets-Sheet 2

INVENTOR.
Earl E. Schoessow
BY
ATTORNEY

United States Patent Office 3,055,538
Patented Sept. 25, 1962

3,055,538
PRESSURE VESSEL SEAL
Earl E. Schoessow, Lynchburg, Va., assignor to The Babcock & Wilcox Company, New York, N.Y., a corporation of New Jersey
Filed Jan. 30, 1958, Ser. No. 712,175
10 Claims. (Cl. 220—46)

This invention relates in general to a seal for pressure vessels and more particularly to a fluid tight pressure seal integrally attached to a pressure vessel.

In a number of present day processes using pressure vessels, it has become increasingly more important to provide an absolute fluid tight pressure seal for the closure of the pressure vessel. The fluids used in the pressure vessels in these processes are such that even a minimum amount of uncontrolled leakage would prove hazardous to personnel and equipment. In consideration of the dangerous nature of the fluids contained within the pressure vessel it becomes absolutely essential to avoid any uncontrolled leakage of the fluid therefrom. In addition, it is generally necessary in these processes that frequent access be had to the interior of the pressure vessels. Therefore, it is also important to have a vessel closure seal which can be easily removed and re-established. Hence, it is the purpose of the present invention to provide an absolute fluid tight pressure seal for a pressure vessel closure which can be easily removed and re-established.

In accordance with the present invention a pressure vessel closure is provided with a fluid tight pressure seal. Connecting means are arranged to force a closure member into compressed relationship with a pressure vessel. A flexible membrane is disposed across the joint between the pressure vessel and closure member and is integrally connected to the opposite sides of the joint to form a fluid tight pressure seal therefor.

In addition to the arrangement set forth above, the present invention also provides matching faces on the pressure vessel and the closure member and an annular open space arranged within the outer portion of these matching faces. The flexible membrane is arranged between these matching faces and is integrally connected to the opposite sides of the joint between the pressure vessel and the closure member.

Further, the present invention provides gasket means disposed between the matching faces of the pressure vessel and the closure member to effect a substantially fluid tight seal therefor. The gasket means are also arranged to provide a leak collection space which is connected to an exterior leak collection container by means of a passage located within the walls of either the pressure vessel or the closure member.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which a certain specific embodiment of the invention is illustrated and described.

Figure 1:
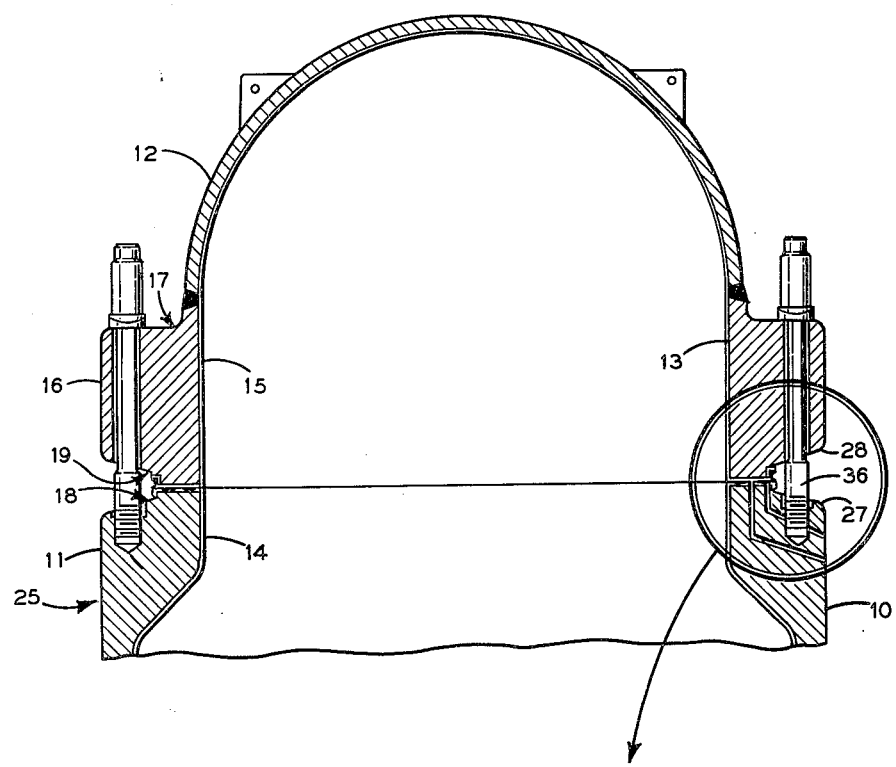
FIG. 1 is a partial longitudinal section of a pressure vessel provided with a closure seal embodying this invention.

Referring to the drawings, FIG. 1 shows a vertical sectional view of one end of a vertically elongated, cylindrical pressure vessel 10 having a circular opening therein formed by a reinforced wall section 11. The reinforced wall section provides the pressure vessel with an inwardly projecting flange 25. A closure member 12 of generally hemispherical shape has wall 16 of increased thickness which forms a flange 17. The flange 17 of the closure member is arranged to engageably match with the flange 25 to form a closure for the pressure vessel 10. A corrosion resistant cladding 13 is integrally attached to the pressure vessel and the closure member and forms the facing on a pressure vessel inner surface 14 and a closure member inner surface 15.

A pressure member matching face 18 and a corresponding closure member matching face 19 form the opposing faces of a closure joint which is disposed transversely of the vertical axis of the pressure vessel 10. The pressure member matching face 18 comprises a contacting surface 20, a vertically extending, stepped surface 30 and a non-contacting surface 22. The closure member matching face 19 comprises a contacting surface 21, a vertically extending surface 31 and a non-contacting surface 23. The integrally attached corrosion resistant cladding 13 also forms the facing on the contacting surfaces 20, 21 of the pressure vessel and closure member matching faces.

The pressure vessel contacting surface 20 and the closure member contacting surface 21 both extend radially outward from the inner surfaces 14, 15 of the pressure vessel and closure member respectively. The outer edge face of the pressure vessel contacting surface 20 is formed by the vertically extending stepped surface 30 arranged normal to the contacting surface. The pressure vessel non-contacting surface 22 is arranged to form, in section, an obtuse angle with the stepped surface 30 and extends radially outward to the outer edge 27 of the pressure vessel matching face 18. The outer edge face of the closure member contacting surface 21 is formed by a vertically extending surface 31 disposed in a plane normal to the contacting surface. The closure member non-contacting surface 23 is arranged at a right angle to the vertically extending surface 31 and then extends radially outward at an oblique angle to the outer edge 28 of the closure member matching face 19. The non-contacting surfaces 22, 23 are disposed in opposing and outwardly diverging relationship to form an annular open space 50 therebetween.

A circle of bolt holes 34, having their axis parallel with the vertical axis of the pressure vessel, pass through the flange 17 of the closure member 12. The bolt holes 34 are located in the outer portion of the flange 17 and open to the annular open space 50. Corresponding threaded bolt holes 35 are located in the pressure vessel flange 25 and pass through the non-contacting surface 22. Bolts 36 are arranged within the matching bolt holes 34, 35 to force the closure member 12 into compressed relationship with the pressure vessel 10.

An annular groove 38 of rectangular cross-section is formed by the matching faces 18, 19 and faces toward the open space 50. The base of the groove 38 is provided by the vertically extending surface 31 and its other two sides are formed by opposing interior faces 52, 54. The face 52 is furnished by the outer portion of the contacting face 20 and the face 54 is formed by that portion of the non-contacting surface 23 which lies in a plane normal to surface 31.

An annular, flexible, metallic membrane 40, having a cross section which forms a section of a circle is arranged within the groove 38 and has its convex surface 43 facing toward the interior of the pressure vessel 10. The cross-sectional ends 41, 42 of the membrane 40 are recessed within the annular groove and are welded to the opposing interior faces 52, 54 of the groove to provide a fluid tight pressure seal for the closure of the pressure vessel 10.

A pair of concentrically arranged and radially spaced annular shaped compressible gaskets 44, 45 are located between the contacting surfaces 20, 21. Alternatively, either the pressure vessel contacting surface or the closure member contacting surface may be grooved to receive the gaskets 44, 45. An annular shaped leak collection space 46 is disposed between the radially spaced gaskets 44, 45. A first passageway 47 is formed through the reinforced wall section 11 opening at one end to the leak collection space 46 and at its opposite end to a leak collection container exterior of the pressure vessel.

A second annular space 48 is located between the outer radially spaced gasket 45 and the flexible membrane 40. A second passageway 49 is formed through the reinforced wall section 11 opening at one end to the second annular space 48 and at its opposite end to a point exterior of the pressure vessel.

Figure 2:
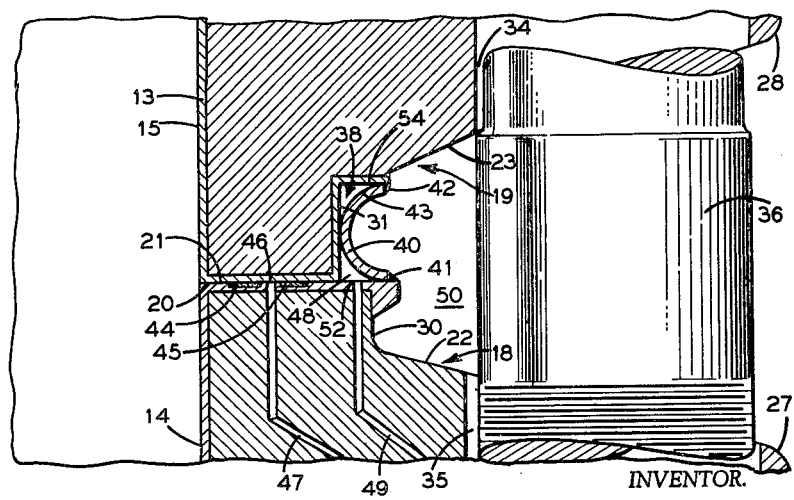
FIG. 2 is a similar view, on an enlarged scale, of the parts which cooperate to provide the fluid tight pressure seal of FIG. 1.
Figure 3:
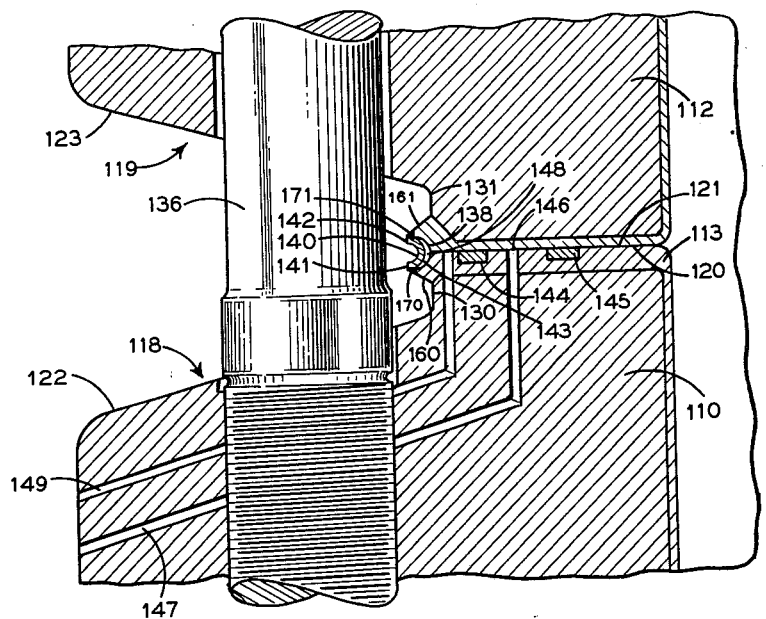
FIG. 3 is a partial vertical section of an alternative embodiment of the invention.

A modified arrangement of the invention is set forth in FIG. 3 and there is used therewith the same numbers to identify similar parts as used on FIG. 1 with the suffix of 100 added. There is shown a partial section of a pressure vessel 110 and a closure member 112 and the joint formed therebetween. The section as illustrated is on the opposite hand to that illustrated in FIG. 2. A circle of bolts 136 forces the closure member into compressed relationship with the pressure vessel. A pressure vessel matching face 118 and a closure member matching face 119 present the opposing surfaces of the pressure vessel closure joint. The matching faces of the pressure vessel and closure member each comprise respectively a contacting surface 120, 121, a vertically extending surface 130, 131 and a non-contacting surface 122, 123.

An integrally attached corrosion resistant cladding 113 provides the facing for the contacting surfaces 120, 121. The cladding provides portions 160, 161 of increased thickness around the outer edges of the contacting surfaces. An annular groove 138 of circular cross-section is formed in the portions 160, 161 and is arranged centrally of the joint between the pressure vessel 110 and the closure member 112. The portion 160, 161 have faces 170, 171 located adjoining the opposite edges of the groove 138 and disposed normal to the contacting surfaces 120, 121.

An annular flexible metallic membrane 140 having a cross-section forming a portion of a circle is disposed within the groove 138 with its convex surface 143 facing toward the interior of the pressure vessel 110. The membrane 140 has cross-sectional ends 141, 142 extending exteriorly of the groove 138. The membrane is integrally joined to the pressure vessel 110 and the closure member 112 by welding the cross-sectional ends 141, 142 to the surfaces 170, 171.

A pair of concentrically arranged and radially spaced, annular shaped, compressible gaskets 144, 145 are located between the contacting surfaces 120, 121. Alternatively, either the pressure vessel contacting surface 120 or the closure member contacting surface 121 may be grooved to receive the gaskets 144, 145. An annular shaped leak collection space 146 is disposed between the radially spaced gaskets. A first passageway 147 is formed through the pressure vessel 110 and opens at one end to the leak collection space and at the other end to a leak collection vessel exterior of the pressure vessel.

A second annular space 148 is located between the outer radially spaced gasket 144 and the flexible membrane 140. A second passageway 149 is formed through the wall of the pressure vessel 110 opening at one end to the second annular space 148 and at its opposite end to a point exterior of the pressure vessel.

Accordingly, the present invention provides a fluid tight pressure seal for a pressure vessel closure wherein the flexible membrane which acts as the final and absolute seal is located across the joint between the pressure vessel and the closure member. The installation of the flexible membrane, having its convex side opposed to the internal pressure of the pressure vessel, permits the membrane to withstand maximum internal pressures. When high pressures are developed within the pressure vessel differential shear deflections and rotations are set up at the joint of the vessel closure. The flexible membrane is welded to both the pressure vessel and the closure member at this joint and is thereby subjected to the stresses and relative motion set up at the joint. However, the elasticity of the flexible membrane permits it to conform to these applied stresses and relative movements. Therefore, the combination of the arrangement of the flexible membrane at the closure joint and its elastic characteristics allow it to withstand both maximum internal pressure and the combined differential shear deflections and rotations without any loss of its seal.

In addition to providing a seal capable of maintaining its integrity another important feature of the present invention is the ease in which the seal may be both made up and removed. In most pressure vessel closures it is necessary that the closure member be removed at frequent intervals. It is, therefore, important that a seal be used which can be readily and simply made up and removed. The present invention provides a groove into which the membrane seal is easily positioned. The legs of the membrane are easily accessible for welding and for the subsequent removal of the membrane from the joint between the pressure vessel and the closure member. Further, the membrane may be removed by grinding or other suitable method without any substantial damage to the connecting surfaces on the pressure vessel and closure member. Additionally, the cross-sectional shape of the seal membrane can be readily and inexpensively fabricated from tubing thereby eliminating the costs of expansive dies and machining from the expense of manufacture.

A further feature of the invention is the provision of a gasket arrangement which cooperates to supply an additional fluid seal and a leakage trap or collection space. The compressible gaskets are arranged to maintain a fluid seal even though there is relative movement between the pressure vessel and closure member. This fluid seal provided by the gaskets can also act as a barrier to prevent the internal pressure from being exerted against the flexible membrane. Though, as previously mentioned, the flexible membrane is capable of withstanding maximum internal pressure the gaskets furnish an added factor of safety in providing a fluid tight pressure seal for the pressure vessel. Since the gaskets do not provide an absolute seal there is the possibility that some leakage might find its way past them. For this reason an annular leakage collection space is formed between the gaskets to collect any leakage thereto. A passageway connecting this collection space is formed through either the pressure vessel or the closure member walls to convey the collected leakage to a safe handling container exterior of the pressure vessel. This arrangement makes it possible to safely and controllably dispose of any potential leakage and thereby avoid the hazards inherent in uncontrolled leakage.

Another advantage of the gasket arrangement is that the leak collection space can be pressurized using a non-hazardous fluid. By employing the passageway leading from the leakage collection space to the exterior of the pressure vessel the non-hazardous fluid can be placed in the leak collection space at a pressure equal to, or slightly higher than, the internal pressure within the pressure vessel. This arrangement would preclude the possibility of any hazardous leakage of fluid from the pressure vessel.

Another feature of the invention is the provision of a second passageway leading from the annular space between the outer gasket and the membrane seal to the exterior of the vessel. This second passageway provides a positive means to depressurize the convex face of the flexible membrane seal prior to its removal and in addition to drain any hazardous fluid which might be trapped in back of the flexible membrane seal. This allows the removal of the membrane seal without exposing personnel to hazardous leakage or pressures trapped in back of the seal. Further by providing a pair of these second passageways, one as an inlet and the other as an outlet, a clean fluid can be passed continuously through the space behind the seal membrane and thereby remove any hazardous leakage which might be present there.

Therefore, the first and second passageways together with the gaskets provide a means to controllably remove hazardous leakage from the pressure vessel, assist in maintaining the integrity of the flexible membrane seal and permit safe working conditions for personnel removing the pressure vessel seal.

Accordingly, the present invention provides a simple, efficient and economical fluid tight pressure seal with additional means adapted to collect or prevent hazardous leakage from a pressure vessel.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. In combination walls forming a high pressure vessel having a circular opening therein, a closure member engageable with said pressure vessel at said opening, means arranged to force said closure member into compressed relation with said pressure vessel, opposing faces on said pressure vessel and closure member each having an inner portion and an outer portion and forming a closure joint, the inner portions of said opposing faces arranged in substantially contacting relationship, an annular open space arranged between the outer portion of said opposing faces, an annular groove having a curvilinear cross section, said groove formed in the opposing faces of said pressure vessel and closure member, a flexible annular shaped metallic membrane having a curvilinear cross-section and arranged within said annular groove, said membrane integrally connected at its cross-sectional ends to said pressure vessel and closure member to provide a fluid tight pressure seal across the joint between said pressure vessel and closure member, gasket means disposed between the inner portion of said opposing faces inwardly of said flexible membrane to effect a substantially fluid tight seal for said closure joint and arranged to provide a leak collection space, and means for removing leakage from said leak collection space to a point exterior of said pressure vessel.

2. In combination walls forming a high pressure vessel having a circular opening therein, a closure member engageable with said pressure vessel at said opening, means arranged to force said closure member into compressed relation with said pressure vessel, opposing faces on said pressure vessel and said closure member each having an inner portion and an outer portion and forming a closure joint, the inner portions of said opposing faces arranged in substantially contacting relationship, an annular open space arranged between the outer portion of said opposing faces, a corrosion resistant cladding integrally attached to the interior surfaces of said pressure vessel and closure member, an annular outwardly facing groove having a generally U-shaped cross section, said groove formed in the opposing faces of said pressure vessel and said closure member and situated at the joint between said pressure vessel and closure member, a flexible annular shaped metallic membrane having a generally U-shaped cross-section arranged within said annular groove so that the convex side of said membrane faces toward the interior of said pressure vessel, cross sectional ends of said membrane integrally connected to said pressure vessel and closure member to provide a fluid tight pressure seal across the joint between said pressure vessel and closure member, annular compressible gasket means disposed between the inner portion of said opposing faces inwardly of said flexible membrane to effect a substantially fluid tight seal for said closure joint and arranged to provide a leak collection space, a passageway passing through one of said pressure vessel and closure member and having one end opening to said leak collection space and opening at its opposite end to a point exterior of said pressure vessel.

3. In combination walls forming a high pressure vessel having a circular opening in one end thereof, a closure member engageable with said pressure vessel at its opening, threaded securing means arranged to force said closure member into compressed relation with said pressure vessel, opposing faces on said pressure vessel and closure member each having a substantially contacting surface and a non-contacting surface, said non-contacting surfaces extending radially outward from said contacting surfaces and forming an open space between said opposing faces, a corrosion resistant cladding integrally attached to the interior walls of said pressure vessel and closure member and to the contacting surfaces of said opposing faces, an annular outwardly facing groove having an arcuate cross section, said groove formed by said pressure vessel and closure member in the outer edge portion of said contacting surfaces and arranged about the joint between said pressure vessel and closure member, said groove opening to the open space between said opposing faces, a flexible annular shaped metallic membrane having a cross-section forming a portion of a circle and arranged within said annular groove so that the convex side of the membrane faces toward the interior of said pressure vessel, cross-sectional ends of said membrane welded within said groove to said pressure vessel and closure member to provide a fluid tight pressure seal across the joint between said pressure vessel and said closure member, a pair of concentrically arranged and radially spaced compressible gaskets disposed within the contacting surfaces of said opposing faces inwardly of said flexible membrane to effect a substantially fluid tight seal therefor and to provide an annular leak collection space between said gaskets, a passageway passing through one of said pressure vessel or closure member and opening at one end into said annular leak collection space and at its opposite end to a point exterior of said pressure vessel.

4. In combination walls forming a vertically elongated high pressure vessel of circular cross-section having an opening in one end thereof, a flange formed integrally with said pressure vessel and disposed radially outward from said opening, a closure member having a flange arranged to mate with the flange of said pressure vessel, means forming a plurality of corresponding bolt holes in each of said flanges, a plurality of bolts disposed within said bolt holes to force said closure member into compressed relation with said pressure vessel, opposing faces on each of said flanges disposed in a plane normal to the vertical axis of said pressure vessel, each of said opposing faces having a contacting surface and a non-contacting surface, said contacting surfaces extending radially outward from the inner wall of said pressure vessel and closure member and disposed wholly within the bolt circle of said flanges, said non-contacting surfaces extending radially outward from said contacting surfaces to the outer edge of said flanges and forming an annular shaped open space between said flanges, a corrosion resistant cladding integrally attached to the interior walls of said pressure vessel and said closure member and to the contacting faces of said opposing faces, an annular outwardly facing groove having an arcuate cross section, said groove formed by said pressure vessel and said closure member in the outer edge portion of said contacting flange surfaces and arranged centrally of the joint between said pressure vessel and said closure member, welding surfaces located on the outer edge portion of said pressure vessel and closure member contacting surfaces and adjoining the edges of said groove, said groove opening to the open space between said opposing faces and disposed wholly within the bolt circle of said flanges, a flexible annular shaped metallic membrane having a cross-section forming a portion of a circle and arranged within said annular groove so that the convex side of said membrane faces toward the interior of said pressure vessel, cross-sectional ends of said membrane extending exteriorly from said groove to furnish second welding surfaces, a weld deposit placed to join the welding surfaces of said pressure vessel and closure member to the second welding surfaces of said membrane, said membrane providing a fluid tight pressure seal across the joint between said pressure vessel and closure member, a pair of concentrically arranged and radially spaced compressible gaskets disposed between the contacting surfaces of said flanges inwardly of said flexible membrane to effect a substantially fluid tight seal therefor and to provide an annular leak collection space between said gaskets, a passageway through one of said flanges opening at one end to said annular leak collection space and at its opposite end to a point exterior of said pressure vessel.

5. In combination walls forming a vertically elongated high pressure vessel of circular cross-section having an opening in one end thereof arranged normal to the vertical axis of said pressure vessel, a closure member arranged to engage the pressure vessel at said opening, said closure member having walls of increased thickness extending radially outward to form a flange at the section where said closure member contacts said pressure vessel, threaded connecting means arranged to force said closure member into compressed relation with said pressure vessel, opposing faces on said pressure vessel and closure member each having a contacting surface and a non-contacting surface, said contacting surfaces extending radially outward from the inner face of said pressure vessel or closure member walls, said non-contacting surface extending radially outward from said contacting surfaces to the outer edges of said opposing faces, an annular shaped open space formed between the non-contacting surfaces of said opposing faces, a corrosion resistant cladding integrally attached to the interior walls of said pressure vessel and closure member and to the contacting surfaces of said opposing faces, an annular outwardly facing groove of rectangular cross-section formed by said pressure vessel and closure member in the outer edge portion of the contacting surfaces of said opposing faces, said groove opening to the open space between said matching faces and offset axially from the contacting surfaces of said vessel and closure member, a flexible annular shaped metallic membrane having a cross-section which forms a portion of a circle, cross-sectional ends of said membrane arranged within said annular groove and recessed inwardly from the outer edges of said groove, said membrane welded at said cross-sectional ends to the inner faces of said groove to provide a fluid tight pressure seal across the joint between said pressure vessel and closure member, the convex face of said membrane arranged facing toward the interior of said pressure vessel, a pair of concentrically arranged and radially spaced annular shaped compressible gaskets disposed between the contacting surfaces of said pressure vessel and closure member to effect a substantially fluid tight seal therefor and to provide an annular leak collection space between said gaskets, a passageway passing through one of said pressure vessel or said closure member and opening at one end to said annular leak collection space and at its opposite end to a point exterior of said pressure vessel.

6. In combination walls forming a vertically elongated high pressure vessel of circular cross-section having an opening in one end thereof, a flange formed integrally with said pressure vessel and disposed radially outward from said opening, a closure member having a flange arranged to mate with the flange of said pressure vessel, means forming a plurality of corresponding bolt holes in each of said flanges, a plurality of bolts disposed within said bolt holes to force said closure member into compressed relation with said pressure vessel, opposing faces on each of said flanges disposed in a plane normal to the vertical axis of said pressure vessel, each of said opposing faces having a contacting surface and a non-contacting surface, said contacting surfaces extending radially outward from the inner face of said pressure vessel or closure member and disposed wholly within the bolt circle of said flanges, said non-contacting surfaces extending radially outward from said contacting surfaces to the outer edge of said flanges and forming an open space between said flanges, a corrosion resistant cladding integrally attached to the interior walls of said pressure vessel and said closure member and to the contacting faces of said matching faces, an annular outwardly facing groove having an arcuate cross section, said groove formed by said pressure vessel and said closure member in the outer edge portion of said contacting surfaces and arranged centrally of the joint between said pressure vessel and said closure member, welding surfaces located on the outer edge portion of said pressure vessel and closure member contacting surfaces and adjoining the edges of said groove, said groove opening to the open space between said matching faces and disposed wholly within the bolt circle of said flanges, a flexible annular shaped metallic membrane having a cross-section forming a portion of a circle and arranged within said annular groove so that the convex side of said membrane faces toward the interior of said pressure vessel, cross-sectional ends of said membrane extending exteriorly from said groove to furnish second welding surfaces, a weld deposit placed to join the welding surfaces of said pressure vessel and closure member to the second welding surfaces of said membrane, said membrane providing a fluid tight pressure seal across the joint between said pressure vessel and closure member, a pair of concentrically arranged and radially spaced compressible gaskets disposed between the contacting surfaces of said flanges inwardly of said flexible membrane to effect a substantially fluid tight seal therefor and to provide an annular leak collection space between said gaskets, a first passageway through one of said flanges opening at one end to said annular leak collection space and at its opposite end to a point exterior of said pressure vessel, an annular flow path provided between said flexible membrane and the exterior of said compressible gaskets, a second passageway passing through one of said flanges opening at one end to said annular flow path and at its opposite end to a point exterior of said pressure vessel.

7. In combination walls forming a vertically elongated high pressure vessel of circular cross-section having an opening in one end thereof arranged normal to the vertical axis of said pressure vessel, a closure member arranged to engage the pressure vessel at said opening, said closure member having walls of increased thickness extending radially outward to form a flange at the section where said closure member contacts said pressure vessel, threaded connecting means arranged to force said closure member into compressed relation with said pressure vessel, opposing faces on said pressure vessel and closure member each having a contacting surface and a non-contacting surface, said contacting surfaces extending radially outward from the inner face of said pressure vessel and closure member walls, said non-contacting surfaces extending radially outward from said contacting surfaces to the outer edges of said matching faces, an open space formed between the non-contacting surfaces of said matching faces, a corrosion resistant cladding integrally attached to the interior walls of said pressure vessel and closure member and to the contacting surfaces of said matching faces, an annular outwardly facing groove of rectangular cross-section formed by said pressure vessel and closure member in the outer edge portion of the contacting surfaces of said matching faces flanges, said groove opening to the open space between said matching faces and offset axially from the contacting surfaces of said vessel and closure member, a flexible annular shaped metallic membrane having a cross-section which forms a portion of a circle, cross-sectional ends of said membrane arranged within said annular groove and recessed inwardly from the outer edges of said groove, said membrane welded at said cross-sectional ends to the inner faces of said groove to provide a fluid tight pressure seal across the joint between said pressure vessel and closure member, the convex face of said membrane arranged facing toward the interior of said pressure vessel, a pair of concentrically arranged and radially spaced annular shaped compressible gaskets disposed between the contacting surfaces of said pressure vessel and closure member inwardly of said flexible membrane to effect a substantially fluid tight seal therefor and to provide an annular leak collection space between said gaskets, a first passageway passing through one of said pressure vessel and said closure member and opening at one end to said annular leak collection space and at its opposite end to a point exterior of said pressure vessel, an annular flow path provided between said flexible membrane and the exterior of said compressible gaskets, a second passageway passing through one of said pressure vessel and said closure member and opening at one end to said annular flow path and at its opposite end to a point exterior of said pressure vessel.

8. In combination walls forming a high pressure vessel having a circular opening therein, a closure member engageable with said pressure vessel at said opening, means arranged to force said closure member into compressed relation with said pressure vessel, opposing faces on said pressure vessel and closure member each having an inner portion and an outer portion and forming a closure joint, the inner portions of said opposing faces arranged in substantially contacting relationship, the outer portions of said opposing faces spaced apart to provide an annular open space therebetween, an annular groove formed in the inner portion of said opposing faces with its opening facing into said annular space, a flexible annular shaped metallic membrane having a curvilinear cross-section and arranged within said annular groove, said membrane integrally connected at its cross-sectional ends to said pressure vessel and closure member to provide a fluid tight pressure seal across said closure joint, radially spaced inner and outer gasket means disposed between the inner portions of said opposing faces to effect a substantially fluid tight seal therefor and arranged to provide a leak collection space therebetween, means for removing leakage from said leak collection space to a point exterior of said pressure vessel, an annular space formed between said flexible membrane and said outer gasket means, and means connecting said annular space to a point exterior of said pressure vessel.

9. In combination walls forming a high pressure vessel having an opening therein, a closure member engageable with said pressure vessel at said opening, means arranged to attach said closure member to and to force it into compressed relationship with said pressure vessel, opposing faces on said pressure vessel and closure member forming a closure joint therebetween, each of said opposing faces having an inner portion and an outer portion, the outer portion of said opposing faces disposed in spaced relationship forming an annular open space therebetween, a flexible metallic membrane of curvilinear cross-section disposed within the annular open space between said opposing faces inwardly from the means attaching said closure member to said pressure vessel, said flexible membrane integrally connected to said pressure vessel and closure member, means forming an annularly extending channel located in the surface of at least one of the inner portions of said opposing faces inwardly from said flexible membrane, gasket means disposed within said channel providing a leakage collection space within the inner portions of said opposing faces and arranged so that the inner portions of said opposing faces are in contacting relationship and a substantially fluid tight seal is provided for the closure joint, and means to remove leakage from said leakage collection space.

10. In combination walls forming a high pressure vessel of circular cross section having an opening therein, a closure member engageable with said pressure vessel at said opening, means arranged to attach said closure member to and to force it into compressed relationship with said pressure vessel, opposing faces on said pressure vessel forming a closure joint therebetween, each of said opposing faces having a radially inner portion and a radially outer portion, the outer portions of said opposing faces disposed in spaced relationship forming an annular open space therebetween, an annular groove formed in the radially outer edge of the inner portions of said opposing faces with its opening facing outwardly toward said annular space, an annular shaped flexible metallic membrane arranged within said annular groove and connected at its cross-sectional ends to said pressure vessel and closure member to provide a fluid tight pressure seal across said closure joint, means forming an annularly extending channel located in the surface of at least one of the inner portions of said opposing faces inwardly from said flexible membrane, gasket means disposed within said channel providing a leakage collection space within the inner portions of said opposing faces and arranged so that the inner portions of said opposing faces are in contacting relationship and a substantially fluid tight seal is provided for the closure joint, and means for removing leakage from said leakage collection space to a point exterior of said pressure vessel.

References Cited in the file of this patent

UNITED STATES PATENTS

| | | |
|---|---|---|
| 1,165,210 | Smith | Dec. 21, 1915 |
| 1,902,494 | Emmet | Mar. 21, 1933 |
| 1,926,107 | Morehead | Sept. 12, 1933 |
| 2,460,054 | Wiggins | Jan. 25, 1949 |
| 2,492,409 | Worn et al. | Dec. 27, 1949 |
| 2,711,266 | Kopp | June 21, 1955 |
| 2,760,673 | Laurent | Aug. 28, 1956 |